Patented Mar. 16, 1948

2,437,710

UNITED STATES PATENT OFFICE 2,437,710

PRODUCTION OF RESINS FROM A METHYL-OL MONOHYDRIC PHENOL AND A POLY-HYDRIC PHENOL

Philip Hamilton Rhodes, Portland, Maine, assignor, by mesne assignments, to Koppers Company, Inc., a corporation of Delaware No Drawing. Application December 3, 1942, Serial No. 467,790

12 Claims. (Cl. 260—54)

The present invention relates to the production of synthetic resins.

Resins produced by condensing a dihydroxy benzene such as resorcin or its substitution products or derivatives with a condensing agent which is usually an aldehyde, as for example, formaldehyde, have valuable properties, as for example, low temperature of cure, fast rate of cure, excellent bonding properties due to the high polarity of the condensed molecules, and high strength. However, for certain uses, it has been found desirable to produce a resin by condensing a mixture of a polyhydroxy benzene, and especially a dihydroxy benzene and its derivatives, such as resorcin, and its derivatives, and a monohydroxy benzene, as for example, phenol, $C_6H_5OH$, with a condensing agent, said resin or resinous condensation product retaining many of the valuable properties of the polyhydroxy condensation product, and especially the dihydroxy benzene condensation product typified by resorcin and its derivatives.

In order to indicate the difficulties encountered in the prior art method of manufacturing mixed resin condensation products of the character above set forth, it may be stated that a resin may be produced by reacting a mixture of phenol and formaldehyde preferably in the ratio of 1 mol of phenol to about 1.2 mols of an aldehyde, typified by formaldehyde, there also preferably being present a catalyst. This reaction which is usually carried out under reflux conditions produces an intermediate or final product in the form of a clear liquid or a solid brittle mass. This product is heat reactive and is known as a one-step or one-stage phenolic resin. However, if the same method is used for the condensation of a mixture of resorcin and phenol, these ingredients making up the same total phenolic body set forth in the above described reaction, the desired reaction end product is not obtained, and as the relative amount of resorcin is increased, the reaction becomes more difficult to control. The end products from the reaction of the mixed phenol and the aldehyde, such as formaldehyde, are principally set-up resorcin resin containing free aldehyde, such as formaldehyde, free phenol, and water. Because the reactivity of the polyhydroxy benzenes, and particularly the dihydroxy benzenes, typified by resorcin, catechol, hydroquinone, and their derivatives and substitution products, is much greater than that of phenol and its derivatives and/or substitution products, the polyhydroxy benzenes react to completion with the formaldehyde before any substantial reaction takes place between the phenol and the formaldehyde.

It has been ascertained that the valuable properties characteristic of resorcin resin, as herein pointed out, are seldom imparted to the mixed resin unless at least about 25% of the reacting phenolic body is resorcin. It has also been ascertained that even where the permanently fusible or two-step type of mixed resin is desired, it is necessary to use more than 75% of resorcin or other polyhydroxy benzene, such as catechol, hydroquinone, pyrogallol, phloroglucinol, and the like, when the reaction is carried out in the manner well known in the production of phenolic resins. The pyrogallol and phloroglucinol are representative of trihydroxy benzenes which are also known by the name of trihydric phenols.

In accordance with the present invention, one-stage or two-stage resins may be produced from a plurality of phenolic compounds, one of which is a polyhydroxy benzene or a substitution product or derivative thereof, regardless of the relative proportions of the different phenolic bodies present; that is, of the monohydroxy benzene typified by phenol, $C_6H_5OH$, or its derivatives and substitution products, and polyhydroxy benzenes, their substitution products and derivatives, as typified by resorcin, catechol, hydroquinone, pyrogallol, phloroglucinol, and their derivatives and/or substitution products, there being present in the mixture a methylol radical or group, said radical being preferably present in one of the monohydroxy benzene compounds, typified by phenol, the cresols, cresylic acid, the xylenols, and the like, although it may be present in one of the polyhydroxy benzenes, such as the dihydroxy benzenes, typified by resorcin, catechol, hydroquinone, and their derivatives and/or substitution products. The methylol radical may also be present in the trihydroxy benzenes, such as pyrogallol, phloroglucinol, and the like. A methylol compound contains the radical $CH_2OH$, which is herein termed the methylol radical. The methylol compound present in the reaction may have a single methylol radical or a plurality of methylol radicals. Dimethylol para cresol is an example of a monohydroxy benzene or phenol which has a plurality of methylol radicals. The methylol groups need not necessarily be attached to a benzene ring as in a mono- or poly-hydroxy benzene, but may be attached to aliphatic or cyclic radicals or compounds. Examples are urea and thiourea, including dimethylol urea, dimethylol thiourea, melamine, trimethylolnitromethane, and the like. Illustrative compounds having three methylol radicals present are trimethylol amino methane, and trimethylol melamine.

The reaction mixture of the polyhydroxy benzene and monohydroxy benzene, such as mixtures of a dihydroxy benzene and a monohydroxy benzene; or a mixture of a trihydroxy benzene and a monohydroxy benzene; or a mixture of a trihydroxy benzene, a dihydroxy benzene and a monohydroxy benzene; or mixtures containing derivatives or substitution products of any or all of said hydroxy benzenes, may have the methylol containing constituent or compound present in an amount to produce a one-stage reaction product, or, alternatively, only sufficient methylol-containing compound may be present to produce a two-stage resin, which requires an additional setting agent to make the intermediate product set-up. This setting agent may be a methylol containing compound or a methylene containing compound, or a mixture thereof in which the methylol containing compound predominates, or vice versa.

In accordance with one aspect of the present invention, there is produced a condensation product from a mixture of a hydroxy benzene or a phenolic body which may be a monohydroxy benzene, its derivatives and/or substitution products, a dihydroxy benzene, its derivatives and/or substitution products, or a trihydroxy benzene, its derivatives and/or substitution products, or any or all of these hydroxy benzenes, their derivatives and/or substitution products, there also being present in the reaction mixture a methylol containing compound, said condensation product being permanently fusible, and capable of being heat-hardened by adding thereto a setting agent which may comprise a methylol containing compound capable of effecting hardening without detrimentally affecting the permanently fusible resinous body or the final heat reactive addition product thereof with a setting agent; or the setting agent may be a methylene containing compound commonly used as a setting agent in the resin art, said methylene containing compound being typified by hexamethylene tetramine. It is desired to point out that the various oxy methylenes, paraform, or paraldehyde may be used, or any polymer or homolog of formaldehyde may be used. Various polymerized forms of formaldehyde now known in the art may also be employed. The setting agent may comprise a mixture of any of the above described methylene containing compounds or their equivalents as set forth, and a methylol containing compound which is preferably substantially unpolymerized.

It is within the province of the present invention to produce a condensation product from a mixture of a phenolic body which may be a polyhydroxy benzene, a trihydroxy benzene, typified by pyrogallol and phloroglucinol, their derivatives and/or substitution products; a dihydroxy benzene, typified by resorcin, catechol, hydroquinone, their derivatives and/or substitution products; a monohydroxy benzene, such as phenol, cresol, the xylenols, and the like; or a mixture of any or all of said hydroxy benzenes together with a supplemental resin forming compound, as for example, the ureas, their derivatives and/or substitution products, the thioureas, their derivatives and/or substitution products, the melamines, their derivatives and/or substitution products. There is also present in the mixture a methylol radical or plurality of methylol radicals functioning to assist in the condensation, said methylol radical being combined with said second or supplemental resin forming material, the latter being exemplified by di-methylol thiourea, its derivatives and/or substitution products. There may also be used methylol substituted phenols, their derivatives and/or substitution products. As illustrative of the methylol substituted phenols, there may be mentioned di-methylol cresol, di-methylol xylenol. The second resin forming material may be trimethylol nitro methane or trimethylol amino methane or their derivatives and/or substitution products. When using compounds of the character set forth as the supplemental resin forming material, the substitution products and/or derivatives should, of course, contain a methylol containing radical, and this radical should not be modified or destroyed by substitution.

It is desired to point out that, using any of the methylol containing compounds for carrying out the production of resins or resinous compositions as herein set forth, and their equivalents, there is prevented the rapid type of exothermic reaction so typical of formaldehyde when the latter is employed in the condensation of resin forming materials, and particularly in the condensation of those compounds or materials herein set forth, or their equivalents.

The following examples are illustrative of the present invention:

*Example 1*

A mixture is made from the following ingredients:

| | Grams |
|---|---|
| Resorcin | 55 |
| Dimethylol para cresol | 84 |
| 26° Bé. ammonia | 5 |

The ammonium hydroxide and resorcin are mixed together and heated to about 70° to 100° C. under reflux until a homogeneous liquid is produced. When the proportions are as above set forth, the mixture may be heated for a period of about 10 minutes, and thereafter solid dimethylol para cresol is added. The resulting mass is maintained at reflux temperature until the reaction between the mixture constituents is substantially completed. Using the above proportions, it has been found that about 1 hour is sufficient. The resulting mass assumes a viscous resinous state, which desirably is dehydrated under a vacuum, at temperatures of about 60° to 90° C. to produce a brittle heat reactive resin. The resin may be dehydrated so that it contains between .5% to 5.0% of water. While it is desirable for certain uses to remove the water by dehydration of the reaction product, it is recognized that for certain uses it may be desirable to leave the water content in the resin, and in some cases it is even desirable to add an additional solvent. The dehydrated resin may be dissolved in a suitable solvent such as has been previously used in the prior art for preparing solutions of resins in organic solvents. Examples of suitable solvents are the alcohols, including methanol, ethanol, propanol, and other higher alcohols; aliphatic ketones, such as ethyl, methyl or butyl ketones, and the higher ketones; mixed ketones, typified by methyl ethyl ketone and ketones carrying other dissimilar aliphatic radicals; aromatic ketones, and acetone.

Example 2

A mixture is made from the following ingredients:

| | Grams |
|---|---|
| Resorcin | 55 |
| Dimethylol para cresol | 60 |
| Oxalic acid | 2 |

The resorcin, oxalic acid, and a few grams of water are heated to form a homogeneous liquid, and then the dimethylol para cresol is added. The mass is then heated to reflux temperature, which as around 100° C., until the reaction between the mixture constituents has been substantially completed. Using the above proportions, it is sufficient to maintain the reaction mixture under reflux conditions for 1 or 2 hours. However, obviously the time will vary in accordance with the actual operating conditions, including the amount of reaction constituents used in carrying out the condensation reaction. The reflux is thereafter removed and the resulting viscous resinous mass is dehydrated under a vacuum to produce a brittle permanently fusible resin soluble in water and in organic solvents including those hereinbefore set forth. Here, again, the dehydration is optional. The resulting permanently fusible resin may be made heat reactive by the addition of a setting agent which may be of the same character as the dimethylol compound used in the reaction, as typified by dimethylol para cresol, or other compounds containing the methylol radical may be used for the purpose of setting the intermediate permanently fusible resinous condensation product, the effective portion of the setting agent being the methylol radical. Therefore, any organic compound containing this radical may be used as a setting agent provided it exerts no deleterious influence upon the permanently fusible resin interfering with its setting, and does not adversely affect the final addition product of any permanently fusible resin and the setting agent. Instead of using dimethylol para cresol or other methylol compounds as the setting agent, a methylene containing body such as hexamethylene tetramine or its equivalents may be used, or the setting agent may be a mixture of a methylol containing compound and a methylene containing compound, as herein set forth. The hardening agent such as the methylol containing compound or the hexamethylene tetramine, or a mixture of the two in any proportions, may be added to the permanently fusible resin in amounts broadly varying between 1% to 30%. Preferably the amount of hardening or setting agent added varies between 5% to 20%, and most desirably between 8% and 15%. These percentages are taken on the weight of the dehydrated resin which, as stated, may contain from .5% to 5% of water.

Example 3

A mixture is made from the following ingredients:

| | Grams |
|---|---|
| Resorcin | 55 |
| Dimethylol urea | 50 |
| Oxalic acid | 2 |

The resorcin is melted in a suitable vessel together with the oxalic acid, which is preferably added in a solid state. When the above reaction mass is molten, dimethylol urea is then added. The reaction is allowed to proceed under heat to completion. Thereafter, the resulting liquid mass is dehydrated under a vacuum to produce a fusible, brittle resin. The resulting permanently fusible resin is soluble in organic solvents of the character set forth and may have a setting agent added thereto to produce an addition product which is thermosetting, the mixture of the intermediate permanently fusible resin and the setting agent being preferably heated to a suitable curing temperature, as for example, from 100° to 125° C. This temperature range is merely illustrative and not by way of limitation. The setting agent may comprise dimethylol urea or other organic compound containing methylol radicals functioning to set up the intermediately permanently fusible product without adversely affecting the latter or the final insoluble infusible product. The amount of methylol containing setting agent will vary within the limits above set forth. When a mixture of a methylol containing setting agent and a methylene containing setting agent is used, it is preferred that the methylol containing setting agent should predominate, although in some cases the methylene containing setting agent may predominate in the setting mixture. When a mixture of setting agents of the character set forth is used, it is preferable that the amount vary between 5% and 20% taken on the weight of the dehydrated intermediate permanently fusible resin.

Example 4

A mixture is made from the following ingredients:

| | Grams |
|---|---|
| Resorcin | 55 |
| Dimethylol urea | 75 |
| 26° Bé. ammonia | 5 |

The ammonium hydroxide and resorcin are mixed together and heated under reflux conditions to a temperature usually varying between 70° and 100° C., until a homogeneous liquid is produced. There is then added the dimethylol urea and the resulting mass is maintained at or adjacent reflux temperature until the reaction between the mixture constituents is substantially completed and there is produced a fairly viscous product. The latter may then be dehydrated under vacuum to form a brittle heat reactive resin which is soluble in the usual organic solvents including those herein set forth. If the brittle one-step heat reactive resin or resinous material is to be used in the form of an aqueous solution, and it can be so used for many purposes, then it is not necessary to dehydrate the reaction product, although in some cases a certain amount of dehydration may be effected. When the intermediate product is to be shipped in the form of a solid, it is desirable that the product be substantially dehydrated so that its water content shall not be greater than 5% and preferably varies between .5% to 2%, and as the usual rule the water content will be somewhere within the range of .5% to 5% of water.

Example 5

A mixture is made from the following ingredients:

| | Grams |
|---|---|
| Resorcin | 50 |
| Trimethylol nitro methane | 50 |

The resorcin and the trimethylol nitro methane are heated together into a liquid. Thereafter, the temperature is raised to about 100° to 120° C. in order that the reaction may be substantially completed. It is desired to point out that the reaction between these constituents is highly exothermic and the reaction becomes quite violent when the reacting components are heated much beyond 125° to 130° C. By keeping the reaction temperature below 125° to 130° C., the reaction may be brought to substantial completion without violence. Thereafter, the mass may be dehydrated to produce a dark colored brittle heat reactive resin.

Example 6

A mixture is made from the following ingredients:

| | Grams |
|---|---|
| Resorcin | 50 |
| Trimethylol amino methane | 50 |

The resorcin and the trimethylol amino methane are melted together and the temperature gradually raised to the reflux temperature which is adjacent 100° C. The resulting mass is maintained at reflux temperature until the reaction between the mixture constituents is substantially completed. Using the quantities above set forth, the reaction appears to be fairly well completed in about 1 hour. This time of reaction is illustrative and not by way of limitation, as obviously this will vary. The reflux is thereafter removed and the temperature of the reaction mass raised as rapidly as possible to a range varying between 160° to 200° C. This temperature range is maintained until the excess of the methylol containing compound has been distilled from the reaction mass. The resulting liquid cools to a brittle fusible resin or resinous mass which is soluble in organic solvents of the character herein set forth, and which is also soluble in water. This intermediate permanently fusible resin may be converted into a heat hardenable compound by adding a setting agent thereto which may be trimethylol nitro methane in an amount varying between 5% and 20% taken on the weight of the dehydrated intermediate fusible resin, or it may be any other methylol containing compound, or a methylene containing compound, or a mixture of the two compounded as hereinbefore set forth.

Example 7

A mixture is made from the following ingredients:

| | Grams |
|---|---|
| Phenol | 47 |
| Dimethylol urea | 60 |
| Oxalic acid | 3 |

The phenol and the oxalic acid are mixed together and then melted until a homogeneous liquid is produced. Thereafter, the dimethylol urea is added. The resulting mixture is heated slowly to reflux temperature adjacent 100° C. and maintained at said temperature until the reaction is completed. Using the quantities above set forth, the heating period is about 1 hour, although this period will vary with the exact operating conditions including quantities of the materials reacted and therefore the time period is by way of illustration and not by limitation. It is desired to point out that when the above reaction is carried out, there is no separation of water such as usually occurs in the production of phenolic resins by condensing a monohydroxy phenol or a monohydroxy benzene with an aldehyde such as formaldehyde and the like. The resulting reaction liquid may be dehydrated to produce a brittle permanently fusible resin which may be substantially anhydrous or which may have its water content greatly reduced so that it does not exceed 2% to 3% and should not be over 5% taken on the weight of the intermediate resin. In general, the water content may vary between .5% to 5%. The resulting permanently fusible intermediate resin or resinous material may be made heat reactive by combining therewith a setting agent such as dimethylol urea or a methylene containing compound such as hexamethylene tetramine, or mixtures thereof, as previously set forth.

Example 8

A mixture is made from the following ingredients:

| | Grams |
|---|---|
| Phenol | 47 |
| Dimethylol urea | 76 |
| 26° Bé. ammonia | 5 |

The phenol, $C_6H_5OH$, ammonium hydroxide and dimethylol urea are mixed together and gradually heated until they are brought up to reflux temperature, which is about 100° C. The resulting mass is maintained at and adjacent reflux temperature until the reaction between the mixture constituents is substantially completed. The reflux is maintained for about 2 to 3 hours, whereupon there is produced a viscous heat reactive product. This viscous liquid may be dehydrated under a vacuum or by any other appropriate means and then cooled, whereupon there is produced a brittle one-step heat reactive resin.

The above examples are illustrative and it is not desired that they be construed as limitations upon the broad invention herein set forth. The invention has been broadly stated in the introductory paragraphs and preferred embodiments thereof have been set forth, the examples being specific embodiments of the invention. It is desired to point out that in Examples 7 and 8, in lieu of the phenol there may be employed cresols, cresylic acid, xylenols and the like. It is desired to point out that cresylic acid contains a small amount of phenol, the three cresols, and considerable amounts of higher phenols including various xylenols. There is also present in commercial cresylic acid which may be used in carrying out the present invention various higher tar acid fractions. The cresylic acid herein used may be used with these tar acid fractions present, or said fractions may be removed and the resulting cresylic acid used. Instead of using in said examples dimethylol urea, there may be substituted therefor dimethylol thiourea or mixtures thereof, or, alternatively, there may be substituted for the dimethylol urea, methylol substituted phenols, and in general there may be substituted in any of the examples herein set forth for the specific methylol compound referred to other equivalent methylol containing compounds, it having been pointed out that the compound which reacts with the first resin forming constituent such as phenol, $C_6H_5OH$, or pyrogallol, preferably has a methylol radical present. Phenol, resorcin, pyrogallol, their derivatives and/or substitution products, are examples of aromatic resin forming constituents which may be mixed with an aromatic, aliphatic or heterocyclic methylol containing compound. Dimethylol para cresol is an example of a methylol containing aromatic compound. Having referred to the different classes of methylol compounds which may be used as one of the resin forming constituents, or as a setting agent for an intermediate permanently fusible resin, various compounds which may be used will become apparent to those skilled in the art.

It is desired to point out that methylol containing compounds may be used as setting or hardening agents for any of the prior art resins of the phenolic type which have been made by condensing a hydroxy benzene including monohydroxy benzene, dihydroxy benzene, polyhydroxy benzene, their derivatives and/or substitution products, and especially those herein set forth, or mixtures of any of the above, with an aldehyde condensing agent, as for example, formaldehyde, acetaldehyde, paraldehyde, propionaldehyde, the butyl aldehydes, the furfuralaldehydes, and the like. Such resins may, of course, be made by reacting the hydroxy benzene with a mixture of aldehydes, such as a mixture of formaldehyde and butyl aldehyde. In the production of these resins, dialdehydes may also be used in place of the monoaldehydes, glyoxal being representative of the dialdehydes. A two-stage resin produced by reacting any of the herein set forth hydroxy benzenes, their derivatives and/or substitution products, with any of the herein set forth aldehydes or their equivalents, may have heat hardenable properties imparted thereto by setting the same with a methylol containing setting agent.

More specifically, a resin produced in the following manner may be reacted with 5% to 20%, and preferably 10% to 15% by weight of a methylol containing compound, as for example, polymethylol sodium phenate, polymerization of said methylol containing compound having been substantially inhibited.

About 2500 grams of resorcin are reacted with 500 grams of 37% formaldehyde solution in a suitable reaction vessel. Preferably, the reaction vessel comprises a steam jacketed kettle equipped with a horse-shoe agitator, a reflux condenser, and an addition valve. The formaldehyde is added to the resorcin present in the vessel and thereafter the jacket is gradually heated so that the temperature of the resorcin formaldehyde mixture is slowly raised to 100° C. as the resorcin goes into solution, great care being taken that the mixture does not become too ebullient, and boil over. As the temperature reaches 100° C., the steam jacket is taken out of circuit and then about 750 grams of 37% formaldehyde are gradually added to the kettle. The rate of addition is governed by the temperature of the mixture. The particular mixture above set forth is not permitted to become heated to over 110° C., no boiling over occurring. As the formaldehyde is added to the partially reacted mass, heat is generated and the rate of reaction is controlled so that the heat given off is not sufficient to cause the mass to boil over. Usually the formaldehyde is added gradually in increments, the time of addition being usually about 1¼ to 1½ hours. However, this will vary with the size of the reaction mass and on large scale production, may take as long as two or three hours.

During the last of the addition of the formaldehyde to the partially reacted mass, the rate of reaction slows down and there usually remains in the reaction mass about 5% to 10% of formaldehyde which has not yet combined with the resorcin. In order to combine this last increment of uncombined formaldehyde without successive advancement of the resin already formed, a catalyst is added as soon as the addition of the formaldehyde is complete. If this is not done and the formaldehyde is completely combined by the long application of heat, part of the resin formed in the initial stages of the reaction will advance so far as to threaten gellation and perhaps inhibit the complete removal of the water. In the above, no catalyst is present. However, if a catalyst is added in the early stages of the reaction, the initial resin formation advances before the final increment of formaldehyde is tied up and thickens the mass so that it is difficult to remove the water from the reaction mass.

If the total time of running the above resin batch from the quantities set forth is 2½ to 2¾ hours, the extent of dehydration is such that the residual moisture remaining in the processed resin varies between about .5% to .7%. However, if the time of the reaction is slowed down to 3¼ to 3½ hours, the residual moisture may be on the average about 1% to 1.5%. When utilizing larger batches and different processing apparatus, the time of a slow reaction and the time of a rapid reaction may vary, but the relative dehydration results will remain approximately comparable; that is, for the shorter reaction period, the dehydration will be more complete.

The addition of the catalyst toward the end of the reaction ties up the last amounts of formaldehyde quickly before the resin already formed has a chance to advance too far and prevent the complete dehydration of the final product. When all the formaldehyde has been added, there is then added a suitable acid catalyst such as oxalic acid, acetic acid, citric acid, boric acid or any of the mineral acids such as sulfuric acid and hydrochloric acid. Specifically, to the mixture above set forth there may be added sufficient oxalic acid crystals to assist in completing the reaction. When the reacting ingredients are present in the proportions above set forth, 15 grams of oxalic acid crystals are sufficient to complete the reaction. Instead of adding the catalyst in a dry state, the latter may be added in solution, as for example, the oxalic acid crystals may be dissolved in water or equivalent medium.

During the time that the second addition of formaldehyde is added, heat is furnished by the exothermic reaction of the formaldehyde with the resorcin. At about the time the catalyst is added, the mass begins to slightly cool and the jacket is reheated, sufficient steam being bled in to rapidly reflux the kettle contents. As soon as the mixture has reached a smooth rapid reflux the condenser is shifted to a water jacketed downward condenser connected to a trap and vacuum pump to distill off the water from the reaction mass. The temperature is maintained by steam pressure on the jacket at about 100° C. during the distillation of the water and a vacuum of about 23 inches is maintained on the system. Distillation is continued with about 50 pounds of steam pressure on the jacket and the temperature gradually rises to 125° to 130° C. at the end of the dehydration period. The dehydration is terminated when the temperature reaches 125° to 130° C. and the distillation is practically stopped. This can be ascertained by checking on the condenser output. When it slows down to 6 or 10 drops per minute, which takes about 45 minutes using the proportions herein set forth, this may be taken as an indication that the dehydration step has terminated. At this point, the agitator is stopped, the kettle is opened, and the liquid resin is poured off. This solidifies to a brittle resin containing less than 1% moisture and usually not over 0.65% as determined by the A. S. T. M. method. Preferably, the reaction is carried out between .67 of a mol of formaldehyde and 1 mol of resorcin in the presence of a suitable acid catalyst added as soon as the final portion of the formaldehyde or other aldehyde has been added. Although the preferred molecular ratio of formaldehyde to resorcin is 0.67 to 1.0, other ratios from 0.5 to 1.0 to 0.9 to 1.0 may be employed. Instead of using formaldehyde, other prior art aldehydes may be used such as acetaldehyde, paraldehyde, propionaldehydes, the butyl aldehydes, the furfuralaldehydes, and the like.

Mild alkaline catalysts such as .5% sodium hydroxide, .2% borax, azoxy-toluidine, aniline and other alkaline catalysts may be used, the latter being preferably added at the same point as the herein described acid catalyst is added; namely, after the complete addition of the formaldehyde or equivalent aldehyde.

The percentage of catalysts is taken upon the amount of dihydroxy benzene, as for example, resorcin, used in carrying out the reaction. In general, the catalyst will vary between about 1% to 2%. This is set forth by way of illustration and as the preferred percentage of catalyst. Obviously, however, the amount of catalyst used will vary depending upon the character of the reacting constituents and the specific manner in which the reaction is carried out.

In some of the examples given, oxalic acid has been used as the acid catalyst. However, in lieu thereof, there may be used any of the strong mineral acids such as hydrochloric acid, sulphuric acid, phosphoric acid, and the like; the weak inorganic acids such as boric acid; and organic acids such as citric acid, salicylic acid, acetic acid, and the like.

In some of the examples, an alkaline catalyst such as ammonia has been used. Equivalent mild alkaline catalysts may be used, such as borax, sodium hydroxide, azoxy-toluidine, aniline, the ethanol amines, including triethanol amine or admixtures thereof with monoethanol amine and/or diethanol amine.

While it is desirable in most cases to use a catalyst either acid or alkaline in order to accelerate the resin forming reaction, the catalyst may be omitted, and in this connection it is desired to point out that in Examples 5 and 6, no catalyst is employed.

In Examples 1, 2, 3, 4, 7 and 8, the amount of catalyst used varies from about 1.9% to about 4% taken on the weight of the reacting constituents. In general, the amount of catalyst used when a methylol containing compound is one of the reacting ingredients will vary from about .1% to 5% taken on the weight of the combined reacting ingredients. This is set forth by way of illustration and as the preferred percentage range of catalyst. Obviously, however, the amount of catalyst used will vary depending upon the character of the reacting constituents and the manner in which the reaction is carried out.

When methylol containing compounds are used as the setting or hardening agent for intermediate permanently fusible thermoplastic resin compositions, such compounds may include dimethylol para cresol, polymethylol phenols, the metal salts thereof including the alkali and the alkaline earth salts, methylol resorcinol, the methylol xylenols, the methylol ureas, including the dimethylol urea, the methylol thioureas, including the dimethylol thiourea, and the methylol melamines.

A solution of polymethylol phenol suitable for use as a setting agent may be prepared in the following manner: 94 grams of phenol are mixed with about 200 cc. of water containing 50 grams of sodium hydroxide, and to this mixture is added 215 grams of 37% formaldehyde solution. The above ingredients are mixed at room temperatures, that is, at about 20° to 25° C. The mixture of the above constituents is allowed to stand for a substantial period of time in order that the reaction may be completed. The reaction should be carried out at a temperature which will not induce any substantial polymerization of the simple polymethylol phenol which is formed. Experiments indicate that if the temperature rises substantially above 40° to 45° C., there is a tendency for polymerization to be initiated. It is not desired to be strictly limited to this temperature as with different amounts of the reacting constituents and different concentrations, the temperature may vary considerably from the above. However, the criterion is that the temperature preferably should be maintained at that point which will prevent the initiation of polymerization of the polymethylol phenol. The polymethylol phenol solution prepared as herein described exists as the sodium salt solution and may be used as such. However, by careful neutralization of the solution, using, for example, dilute acetic acid, the polymethylol compound itself exists in solution and may be isolated by ether extraction or other suitable extraction media.

The condensation products herein disclosed and their equivalents produced in accordance with the general disclosure of the present application may be used as bonding and/or adhesive mediums for the gluing or cementing of articles of all kinds together, including laminated wood, plywood, wooden articles, and the uniting or bonding together of articles at least one of which is a metal article or a natural or synthetic plastic. The resins herein set forth may be used as a laminating solution in the production of laminated articles, and also molded articles may be made from the condensation products herein set forth.

The resin condensation product herein produced may be used in the production of airplane structures, boats, furniture, light structural sections such as beams and arches. The invention is of particular value in the production of laminated wood, plywood, or wherever it is desirable to bond plies of cellulosic material to each other or to provide a laminated or panel structure which may comprise a layer of wood together with a layer of cotton fibers, cloth or asbestos. The plies which are bonded with the adhesives of the present invention may be inorganic in character, as for example, asbestos, glass fibers, and the like.

In the production of airplane structures and boat structures, instead of the alternate plies or layers being of wood, there may be a layer of wood, then a layer of cotton fibers or cloth or asbestos, and then a layer of wood and another layer of cotton fibers or cloth or asbestos. In other words, it is not necessary that both plies be of wood. Only one ply need be of wood and in some cases, the invention may be carried out by using plies of cloth, cotton or other textile material or plies of inorganic material which may be mineral in character, typified by asbestos.

In the production of large structural articles, such as large sections of airplanes, large objects of furniture, and sections of boats, such as the hull of a dinghy, the lamination of the formed article by the conventional methods of pressing is difficult due to the size of the articles being formed. In such cases, it is desirable to wrap the object around the form or use the technique of bag molding in an autoclave. In cases such as this, it has been found that the polyhydroxy benzene resins, including the dihydroxy benzene resins produced by condensing a polyhydroxy benzene compound including the dihydroxy benzene compounds with a methylol containing component, are particularly advantageous because the heat penetration of such thick and large objects is much more difficult than standard small size panels, and the low temperature curing of the polyhydroxy benzene resins lowers the time cycle and the temperature necessary to produce the proper bonding.

Employing bag molding, the laminae with the adhesive applied are placed in position either inside or outside of a hard mold. Pressure is then applied by means of a rubber bag which is wrapped around the piece or inserted in the core of the piece and pumped up with air to the desired pressure. Pressures in this case generally range from 50 to 60 pounds per square inch. In many cases, the whole assembly is slid into an autoclave and baked at a temperature sufficient to cure the resin.

It has been stated that the polyhydroxy benzene or the monohydroxy benzene set forth in some of the examples may have a methylol radical therein. In Example 1, the resorcin may be replaced by methylol resorcin, and the dimethylol para cresol may be replaced by para cresol. Methylol polyhydroxy benzenes may be used in the examples herein set forth and the supplemental resin forming constituent, and it will not be necessary then to have a methylol containing resin in the supplementary resin forming constituent.

It has been stated that substituted dihydroxy benzenes may be used in producing the condensation products set forth in certain of the examples. Illustrative substituted resorcins include secondary alkyl resorcins in which the alkyl member is a lower alkyl or a higher alkyl; monomethyl resorcyl ether; resorcin disulphonic acid esters, and the like.

When the herein disclosed resinous compositions are dissolved in solvents including organic solvents and used for laminating purposes, the resin solution should have present therein preferably between 40% to 50% of solids, although the solution may be more concentrated, as for example, contain about 75% of solids, or be more dilute and contain below 30% of solids.

Utilizing bag molding, pressure may be applied by using a paper or Cellophane bag. To generate the desirable pressure, hot water or steam may also be used.

Having thus described the invention, what is claimed as new and desired to be secured by Letters Patent is:

1. The method comprising producing a homogeneous resinous mass substantially free of undesirable end products comprising heat-reacting at reflux temperature a molten mass the reactants of which consist of a methylol monohydric phenol and a polyhydric phenol until a viscous resin is formed.

2. The method comprising producing a homogeneous resinous mass substantially free of undesirable end products comprising heat-reacting at reflux temperature a molten mass the reactants of which consist of a methylol monohydric phenol and a polyhydric phenol until a viscous resin is formed, and dehydrating the resulting resinous mass to a water-content varying between 0.5% and 5%.

3. The method comprising producing a homogeneous resinous mass substantially free of undesirable end products comprising heat-reacting at reflux temperature a molten mass the reactants of which consist of a methylol monohydric phenol and a polyhydric phenol until a viscous thermoplastic resin is formed.

4. The method comprising producing a homogeneous resinous mass substantially free of undesirable end products comprising heat-reacting at reflux temperature a molten mass the reactants of which consist of a methylol monohydric phenol and a polyhydric phenol until a viscous thermoplastic resin is formed, and dehydrating the resulting resinous mass to a water-content varying between 0.5% and 5%.

5. The method of claim 1 wherein the polyhydric phenol is resorcinol.

6. The method of claim 3 wherein the polyhydric phenol is resorcinol.

7. The method comprising producing a homogeneous resinous mass substantially free of undesirable end products comprising heat-reacting at reflux temperature and in the presence of a catalyst for said reaction a molten mass the reactants of which consist of a methylol monohydric phenol and a polyhydric phenol until a viscous resin is formed.

8. The method comprising producing a homogeneous resinous mass substantially free of undesirable end products comprising heat-reacting at reflux temperature and in the presence of a catalyst for said reaction a molten mass the reactants of which consist of a methylol monohydric phenol and a polyhydric phenol until a viscous resin is formed, and dehydrating the resulting mass to a water-content varying between 0.5% and 5%.

9. The method comprising producing a homogeneous resinous mass substantially free of undesirable end products comprising heat-reacting at reflux temperature and in the presence of a catalyst for said reaction a molten mass the reactants of which consist of a methylol monohydric phenol and a polyhydric phenol until a viscous thermoplastic resin is formed.

10. The method comprising producing a homogeneous resinous mass substantially free of undesirable end products comprising heat-reacting at reflux temperature a molten mass the reactants of which consist of a methylol cresol and a polyhydric phenol until a viscous resin is formed.

11. The method comprising producing a homogeneous resinous mass substantially free of undesirable end products comprising heat-reacting at reflux temperature a molten mass the reactants of which consist of a methylol cresol and resorcin until a viscous resin is formed.

12. The method comprising producing a homogeneous resinous mass substantially free of undesirable end products comprising heat-reacting at reflux temperature a molten mass the reactants of which consist of dimethylol para cresol and resorcin until a viscous resin is formed.

PHILIP HAMILTON RHODES.

(References on following page)

REFERENCES CITED

The following references are of record in the file of this patent:

UNITED STATES PATENTS

| Number | Name | Date |
|---|---|---|
| 1,889,751 | Kessler | Dec. 6, 1932 |
| 1,851,021 | Schuette | Mar. 29, 1932 |
| 1,536,881 | Ellis | May 5, 1925 |

OTHER REFERENCES

Luck, article on pages 306 and 307 of Kunststoffe. vol. 29, No. 11 (1939).

Granger, pp. 442–444, Ind. & Eng. Chem., Apr. 1932.

Granger, pp. 1125–1129, Ind. & Eng. Chem., Oct. 1937.

Morrell, "Synthetic Resins and Allied Plastics," p. 37, pub. 1937 by Oxford Univ. Press., London (copy in Div. 50).

P. 661, Chemical & Met. Engineering, Dec. 1935.